United States Patent
Atawia

(10) Patent No.: US 12,200,551 B2
(45) Date of Patent: Jan. 14, 2025

(54) SECONDARY CELL GROUP SELECTION

(71) Applicant: Dell Products, L.P., Round Rock, TX (US)

(72) Inventor: Ramy Atawia, Kanata (CA)

(73) Assignee: DELL PRODUCTS L.P., Round Rock, TX (US)

( * ) Notice: Subject to any disclaimer, the term of this patent is extended or adjusted under 35 U.S.C. 154(b) by 413 days.

(21) Appl. No.: 17/804,351

(22) Filed: May 27, 2022

(65) Prior Publication Data

US 2023/0388883 A1 Nov. 30, 2023

(51) Int. Cl.
H04W 36/22 (2009.01)
H04W 36/00 (2009.01)
H04W 36/08 (2009.01)

(52) U.S. Cl.
CPC ....... *H04W 36/0069* (2018.08); *H04W 36/08* (2013.01); *H04W 36/22* (2013.01); *H04W 36/00837* (2018.08)

(58) Field of Classification Search
CPC . H04W 36/0069; H04W 36/08; H04W 36/22; H04W 36/00837; H04W 36/00835; H04W 48/16; H04W 72/04; H04W 52/0229
See application file for complete search history.

(56) References Cited

U.S. PATENT DOCUMENTS

2020/0374839 A1* 11/2020 Novlan ............... H04W 72/04
2022/0272568 A1*  8/2022 Lee .................... H04W 52/0229
2022/0353744 A1* 11/2022 Shen .................. H04W 48/16
2022/0386172 A1* 12/2022 Xie ..................... H04W 28/0278

OTHER PUBLICATIONS

"5G; Service requirements for cyber-physical control applications in vertical domains," Technical Specification, 3GPP TS 22.104 version 16.5.0 Release 16, Sep. 2020, 58 pages.

* cited by examiner

*Primary Examiner* — Vinncelas Louis
(74) *Attorney, Agent, or Firm* — Amin, Turocy & Watson, LLP

(57) ABSTRACT

The described technology is generally directed towards secondary cell group selection in the context of a dual connectivity based approach to providing cellular service via private cellular networks. In a dual connectivity arrangement, network traffic can be transported via a master cell group (MCG) provided by a private cellular network, and the network traffic can alternatively be transported via a secondary cell group (SCG) provided by a public cellular network. Network equipment can use the techniques disclosed herein to select an SCG from among candidate SCGs, where the candidate SCGs use different frequency bands having different complementary characteristics with respect to the MCG.

20 Claims, 10 Drawing Sheets

SECONDARY CELL GROUP SELECTION

TECHNICAL FIELD

The subject application generally relates to cellular networks, for example, to selection of cell groups for use by cellular networks, and related embodiments.

BACKGROUND

Various technical approaches can be used to provide high quality cellular service via private cellular networks. Single-band deployments can densify radio units (RUs) of a private cellular network in order to maximize the spectral efficiency of low-band carriers, or to increase the footprint of high-band carriers. However, densifying RUs also increases deployment costs of private cellular networks. Alternatively, multiple-band deployments can adopt multi-band RUs for a private cellular network. However, multi-band RUs can also be expensive in many enterprise scenarios. There is a need for cost-effective and robust solutions to support high quality cellular service via private cellular networks, without necessarily densifying RUs or adopting multi-band RUs.

The above-described background is merely intended to provide a contextual overview of some current issues and is not intended to be exhaustive. Other contextual information may become further apparent upon review of the following detailed description.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
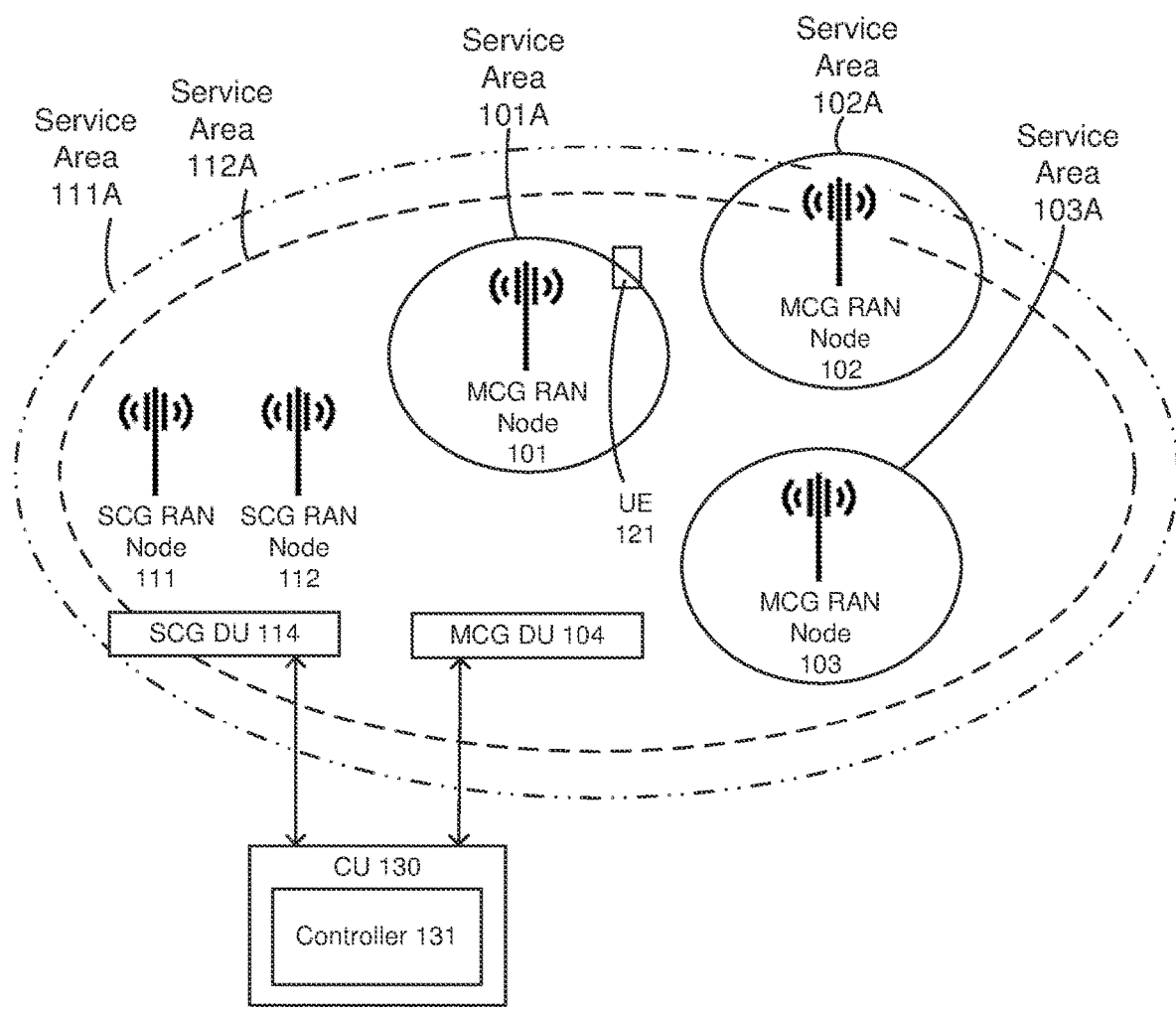
FIG. 1 is a diagram illustrating example elements of a private cellular network and a public cellular network, wherein any of multiple candidate secondary cell groups of the public cellular network can be selected for dual connectivity alongside a master cell group of the private cellular network, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

Example embodiments are directed towards secondary cell group selection in the context of a dual connectivity based approach to providing cellular service via private cellular networks. In a dual connectivity arrangement, network traffic can be transported via a master cell group (MCG) provided by a private cellular network, and the network traffic can alternatively be transported via a secondary cell group (SCG) provided by a public cellular network. Network equipment can use the techniques disclosed herein to select an SCG from among candidate SCGs, where the candidate SCGs use different frequency bands having different complementary characteristics with respect to the MCG. Further aspects and embodiments of this disclosure are described in detail below.

FIG. 1 is a diagram illustrating example elements of a private cellular network and a public cellular network, wherein any of multiple SCGs of the public cellular network can be selected for dual connectivity alongside a MCG of the private cellular network, in accordance with one or more embodiments described herein. FIG. 1 includes example MCG radio access network (RAN) nodes 101, 102, and 103, each of which has a corresponding service area, namely 101A, 102A, and 103A, respectively. FIG. 1 further includes example SCG RAN nodes 111 and 112, each of which has a corresponding service area, namely 111A and 112A respectively.

FIG. 1 further includes an example user equipment (UE) 121, an example MCG distributed unit (DU) 104 which can support the MCG RAN nodes 101, 102, 103, an example SCG DU 104 which can support the SCG RAN nodes 111 and 112, and an example central unit (CU) 130 comprising a controller 131. The controller 131 can be configured to select a public cellular network SCG for use in a dual connectivity arrangement along with the private cellular network MCG RAN nodes 101, 102, and 103.

In an example according to FIG. 1, the private cellular network can be configured to use dual connectivity to improve service to UEs, such as UE 121. Using dual connectivity, the wireless service to a UE 121 by an MCG of a private cellular network can be supplemented under various circumstances by an SCG of a public cellular network. In a scenario such as illustrated in FIG. 1, multiple SCGs are available for dual connectivity. The techniques disclosed herein can be used to select, e.g., by the controller 131, an SCG from among multiple candidate SCGs.

In some embodiments, spectrum allocations can be adjusted for private fifth generation (5G) networks during dual connectivity with co-deployed public networks. In particular, methods disclosed herein can provide optimized selection of SCGs for private 5G networks, wherein selected SCGs can satisfy private network QoS requirements under multi-band deployment scenarios. Methods disclosed herein can consider traffic correlation and band characteristics (e.g., subcarrier spacing) for SCG evaluation and proactive activation. Thus, private network coverage can be improved, and delay requirements for sporadic traffic can be satisfied. Furthermore, operational costs can be reduced by deactivating SCGs when a dedicated MCG is sufficient to satisfy private network traffic.

In some embodiments, dual connectivity can be implemented based on network traffic types. For instance, low-latency downlink multicast traffic can be transported via an MCG provided by a private cellular network, while other traffic can be transported via an SCG provided by a public cellular network.

In some embodiments, dual connectivity solutions can be user-oriented. An SCG can be reconfigured for each user individually, irrespective of other users. However, the use of individually configured SCGs can result in enabling many bands. Private networks can aim to reduce the number of enabled SCG carriers to minimize operational costs under the pay-per-use spectrum allocation model.

Furthermore, dual connectivity solutions can also be load-based. An SCG can be activated when MCG carriers become highly utilized. However, such a reactive load-based approach can result in violating bounded delays of private network applications that require SCGs for fast data transmission even when the load of the MCG is low. Slow transmission over an MCG is not always due to MCG load, and occasionally slow transmission can be attributed to band characteristics such as small subcarrier spacing.

In multi-band scenarios, various frequency bands with complementary characteristics are available as candidates for SCGs. A suboptimal SCG selection can result in violating service (QoS) requirements of network traffic, increasing the operational costs of private networks using pay-per-use band allocations, and data skewing that causes buffer re-ordering and decreased spectral efficiency.

In some embodiments, methods according to this disclosure can select an optimal carrier for use in connection with an SCG used by a private network. The selected carrier can be one that satisfies private network QoS, mobility and coverage requirements. Methods can consider the SCG band characteristics such as subcarrier spacing and duplex mode, whether time division duplex (TDD) or frequency division duplex (FDD). Methods can select an SCG that can provide complementary or supplementary service to the private network MCG. Methods can select a reduced or minimal number of bands for use by an SCG, to decrease the cost of band acquisition. Furthermore, methods can leverage any time-correlation (whether positive or negative correlation) between private network traffic and public network traffic, as well as correlations between different private network applications, to select an SCG as well as to proactively activate a SCG and thus meet private network requirements, e.g., traffic delay requirements.

Figure 2:
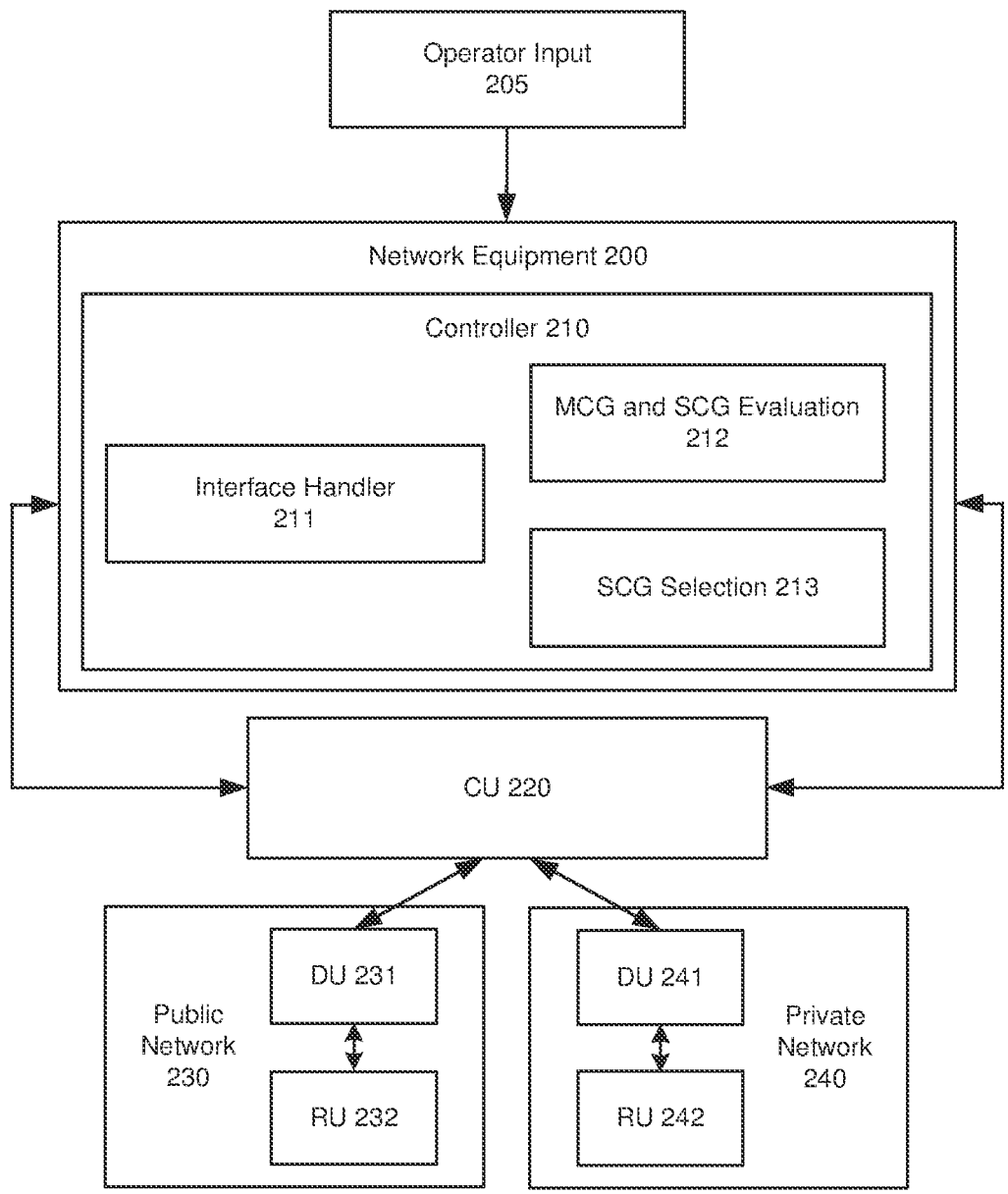
FIG. 2 illustrates an example controller architecture of a controller configured for secondary cell group selection, in accordance with one or more embodiments described herein.

FIG. 2 illustrates an example controller architecture of a controller configured for secondary cell group selection, in accordance with one or more embodiments described herein. FIG. 2 includes an operator input 205, network equipment 200 comprising a controller 210, a CU 220, a public network 230 and a private network 240. The controller 210 includes an interface handler 211, MCG and SCG evaluation 212, and SCG selection 213. The public network 230 comprises a DU 231 and a RU 232. The private network 240 comprises a DU 241 and an RU 242.

In an example embodiment, the controller 210 can optionally implement the controller 131 introduced in FIG. 1. The CU 220 can optionally implement the CU 130 introduced in FIG. 1. The private network 240 can optionally implement a private network comprising the MCG RAN nodes 101, 102, 103 introduced in FIG. 1. The DU 241 can implement the MCG DU 104 introduced in FIG. 1. The RU 242 can implement any of the MCG RAN nodes 101, 102, 103 introduced in FIG. 1. The public network 230 can optionally implement a public network comprising the SCG RAN nodes 111, 112 introduced in FIG. 1. The DU 231 can implement the SCG DU 114 introduced in FIG. 1. The RU 232 can implement any of the SCG RAN nodes 111, 112 introduced in FIG. 1.

The controller 210 can be adapted to implement the SCG selection techniques disclosed herein. In some embodiments, the controller 210 can be hosted in a common service management and orchestration (SMO) layer, which is common to both the public network 230 and the private network 240. Alternatively, the controller 210 can be hosted in the private network's 240 SMO. The CU 220 can comprise a common CU serving both the private network 240 and the public network 230. The CU 220 can be configured to split network traffic of private network 240 users, e.g., UE 121, between the MCG and SCG.

In some embodiments, the operator input 205 can comprise candidate bands associated with different SCGs, QoS requirements of the private network 240, and network traffic priority levels of network traffic handled by the private network 240. The interface handler 211 can be configured to allow the controller 210 to exchange data with RAN nodes (e.g., CU 220, as well as DUs 231, 241 and RUs 232, 242) for data collection. Collected data can include, e.g., delay and coverage key performance indicators (KPIs) and dual connectivity configuration information that identifies the MCG of the private network 240 and available SCGs of the public network 230. The MCG and SCG evaluation 212 can be configured to collect and assess a current dual connectivity configuration, including an MCG and a currently selected SCG, such as by collecting delay and coverage KPIs from the RAN nodes, and evaluating the collected KPIs by comparing them to KPI thresholds. The SCG selection 213 can be configured to enable or disable one or more carriers in SCG, and SCG selection 213 can calculate a traffic splitting ratio between an MCG and an enabled SCG. Furthermore, the CU 220 can be configured to forward KPIs to the controller 210, and to receive and execute a dual connectivity configuration including an MCG, an SCG, and a network traffic splitting ratio, determined by the controller 210.

Figure 3:
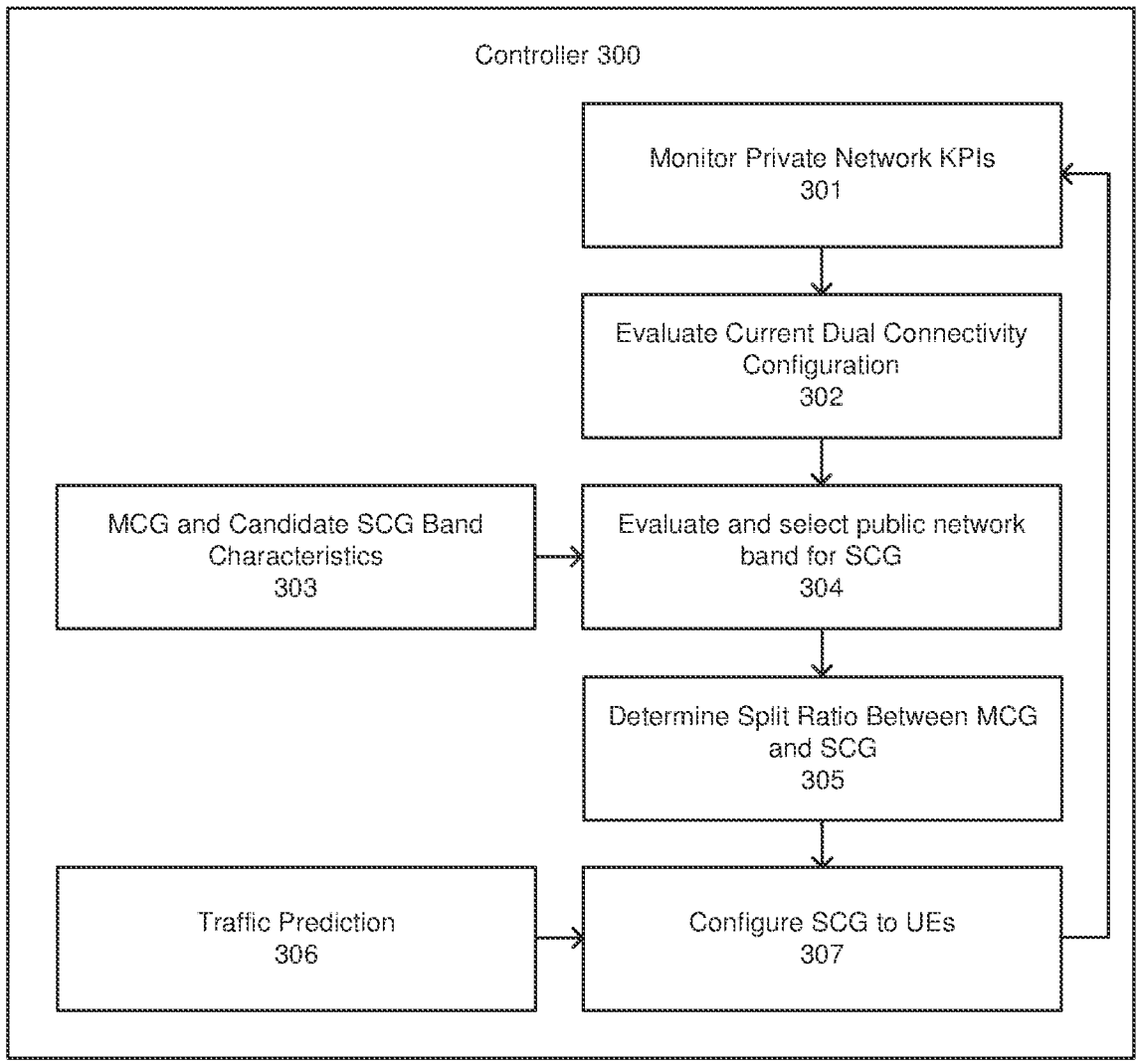
FIG. 3 illustrates example operations that can be performed by a controller such as illustrated in FIG. 2, in accordance with one or more embodiments described herein.

FIG. 3 illustrates example operations that can be performed by a controller such as illustrated in FIG. 2, in accordance with one or more embodiments described herein. The controller 300 can implement the controller 210 introduced in FIG. 2. The controller 300 can be configured to monitor private network KPIs 301, evaluate current dual connectivity configuration 302, evaluate and select public network band for SCG 304 using MCG and candidate SCG band characteristics 303, determine split ratio between MCG and SCG 305, and configure SCG to UEs 307 using a traffic prediction 306.

In example embodiments, monitor private network KPIs 301 can monitor, e.g., packet delay, data rate and coverage related KPIs of private network traffic. Evaluate current dual connectivity configuration 302 can detect degradations due to a current dual connectivity configuration, e.g., due to a missing or suboptimal SCG, and can furthermore optionally detect unutilized carriers in enabled SCGs. Evaluate and select public network band for SCG 304 can estimate resultant QoS KPIs of each candidate SCG, using band characteristics 303. Band characteristics 303 can include, e.g., subcarrier spacing and duplex configuration characteristics. Evaluate and select public network band for SCG 304 can furthermore filter infeasible SCG bands, e.g., by detecting SCGs that can be removed to save cost. Determine split ratio between MCG and SCG 305 can determine network traffic split ratios for each traffic type based on the target KPIs for the traffic type, and the cost of utilizing the SCG. Configure SCG to UEs 307 can either predict the arrival of traffic that requires SCG band activation or use an input traffic prediction 306. Configure SCG to UEs 307 can send radio resource control (RRC) messages to reconfigure SCGs to private network UEs.

Figure 4:
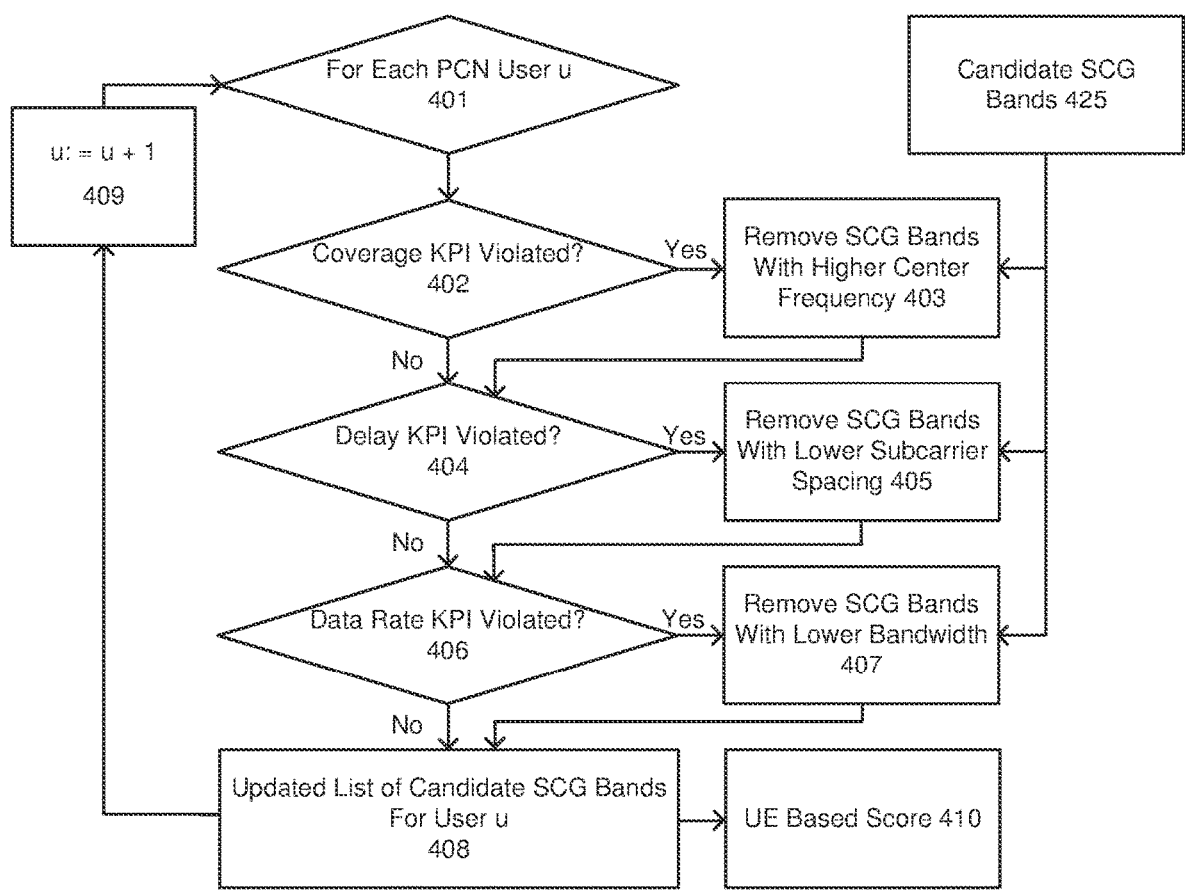
FIG. 4 is a flow diagram illustrating a first group of example operations that can be performed by a controller in connection with secondary cell group selection, in accordance with one or more embodiments described herein.

FIG. 4 is a flow diagram illustrating a first group of example operations that can be performed by a controller in connection with secondary cell group selection, in accordance with one or more embodiments described herein. The illustrated operations can be performed, for example, by a controller 210 such as introduced in FIG. 2.

The operations illustrated in FIG. 4 include, "for each private cellular network (PCN) user u" 401, "coverage KPI violated?" 402. If no at 402, proceed directly to operation 404; if yes at 402, "remove SCG bands with higher center frequency" 403, and proceed to operation 404. Operation 404 comprises, "delay KPI violated?". If no at 404, proceed directly to operation 406; if yes at 404, "remove SCG bands with lower subcarrier spacing" 405, and proceed to operation 406. Operation 406 comprises, "data rate KPI violated?". If no at 406, proceed directly to operation 408; if yes at 406, "remove SCG bands with lower bandwidth" 407, and proceed to operation 408. Each of operations 403, 405, and 407 can use candidate SCG bands 425 as input. Operation 408 comprises, "updated list of candidate SCG bands for user u". At operation 410, a "UE based score" can be generated. At operation 409, the user u can be incremented to the next PCN user, and the illustrated process can repeat for the next PCN user.

In an embodiment, the candidate SCG bands 425 can include, e.g., bands that are available as SCG bands for a private cellular network, such as a band b1, a band b2, a band b3, a band b4, etc. The updated list of candidate SCG bands for user u, generated at operation 408, can include correlated data such as illustrated in the table below:

| User u | Updated List of Candidate SCG Bands |
| --- | --- |
| 1 | {b1, b2, b4} |
| ... | ... |
| u | {b1, b3} |
| ... | ... |
| N | {b1, b2, b3} |

The UE based score generated at operation 410, can include correlated data such as illustrated in the table below, which comprises a number of users that prefer each candidate band b as an SCG band:

| Candidate Band | b1 | b2 | b3 | b4 |
| --- | --- | --- | --- | --- |
| Number of Users | 3 | 2 | 2 | 1 |

Figure 5:
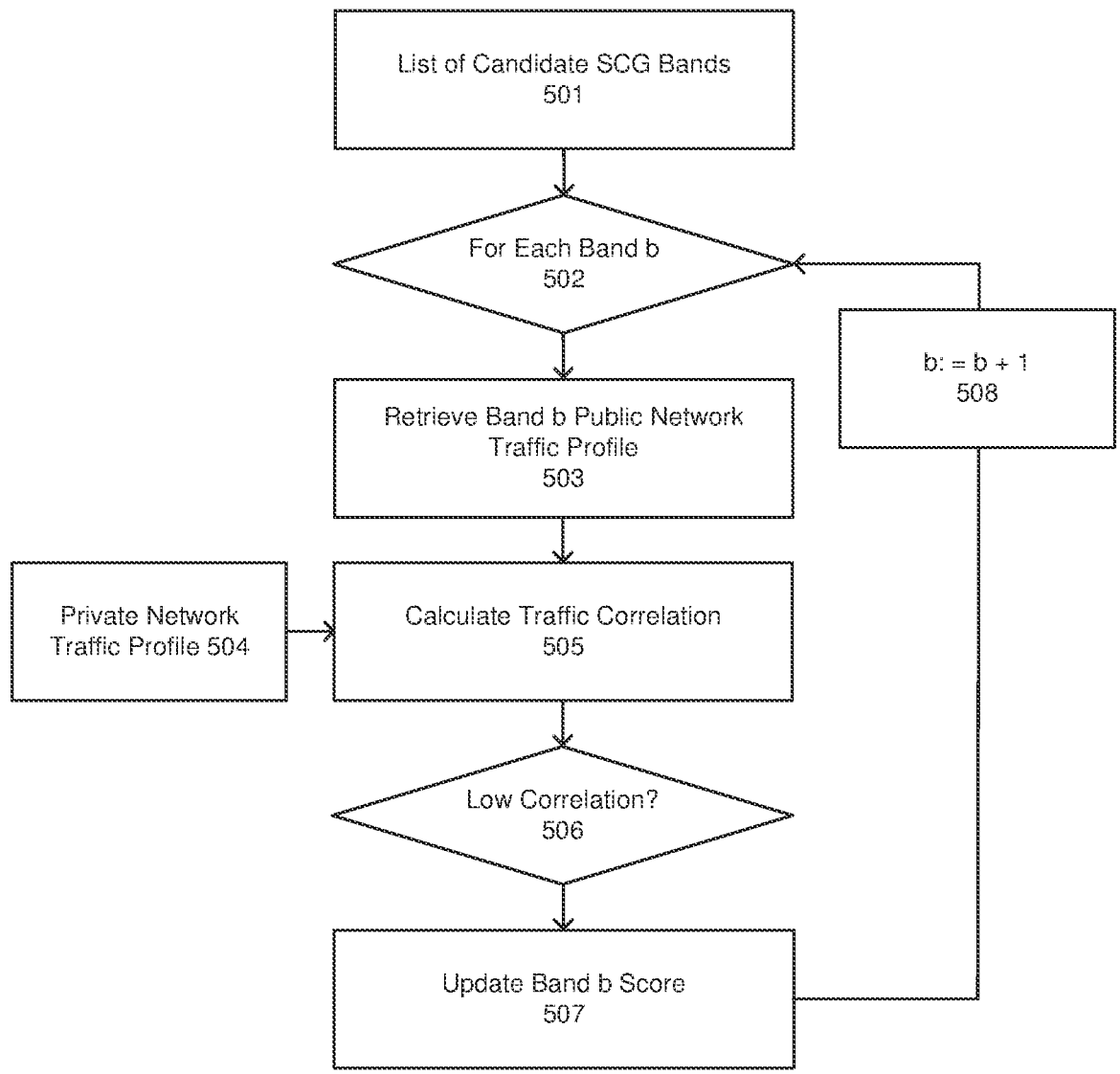
FIG. 5 is a flow diagram illustrating a second group of example operations that can be performed by a controller in connection with secondary cell group selection, in accordance with one or more embodiments described herein.

FIG. 5 is a flow diagram illustrating a second group of example operations that can be performed by a controller in connection with secondary cell group selection, in accordance with one or more embodiments described herein. FIG. 5 includes: list of candidate SCG bands 501, for each band b 502, retrieve band b public network traffic profile 503, private network traffic profile 504, calculate traffic correlation 505, low correlation? 506, update band b score 507, and b: =b+1 (increment to next band) 508.

In an example according to FIG. 5, for each band (502) of a list of candidate SCG bands (501), the band's public network traffic profile can be retrieved (503) and a traffic correlation can be determined (505) between the band's public network traffic profile and a private network traffic profile (504). If there is a low correlation (506), the band's score can be updated (507). For example, a low correlation can be desirable, as the low correlation can indicate that the band's traffic is busy during times when the private network traffic is not busy, and vice versa. Therefore, in some embodiments, the band's score can be adjusted in inverse proportion to the correlation. A next band can be evaluated after incrementing to a next band via operation 508.

With regard to correlation, high correlation can indicate that a band b will experience high traffic during high traffic of the private network, leading to high competition, and vice versa. In some embodiments, scores can be increased by a predetermined amount for bands with low correlation. Bands with low correlation can have more available resources to serve private networks. Some embodiments can calculate the correlation between private and public network traffic using one or more of the following KPIs: physical resource block (PRB) utilization; total bytes in the media access control (MAC) buffer; total bytes transmitted over the air; and/or number of users in an RRC connected state.

Figure 6:
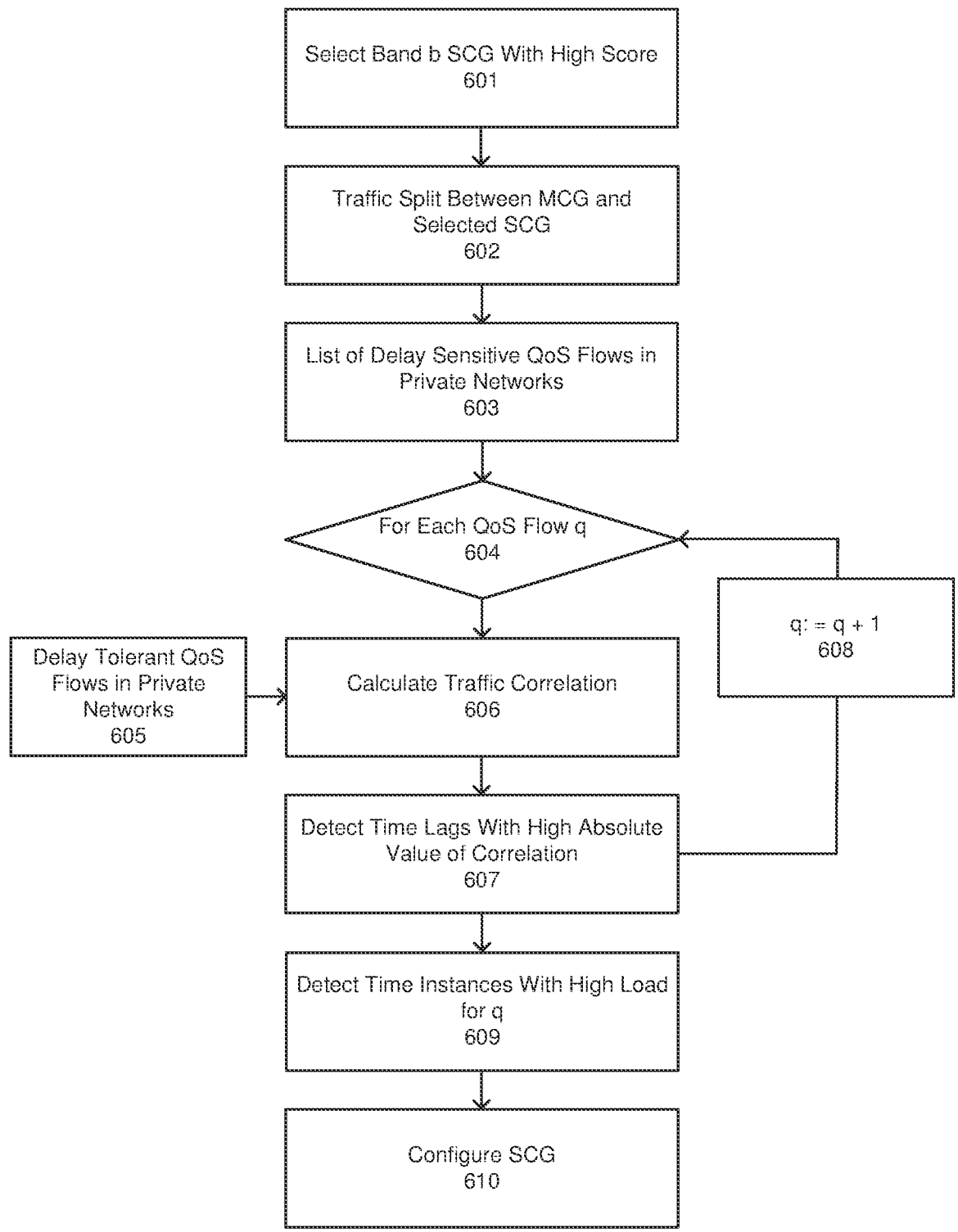
FIG. 6 is a flow diagram illustrating a third group of example operations that can be performed by a controller in connection with secondary cell group selection, in accordance with one or more embodiments described herein.

FIG. 6 is a flow diagram illustrating a third group of example operations that can be performed by a controller in connection with secondary cell group selection, in accordance with one or more embodiments described herein. The illustrated operations can be performed, for example, by a controller 210 such as introduced in FIG. 2.

The operations illustrated in FIG. 6 include: select band b SCG with high score 601, traffic split between MCG and selected SCG 602, list of delay sensitive QoS flows in private networks 603, for each QoS flow q 604, delay tolerant QoS flows in private networks 605, calculate traffic correlation 606, detect time lags with high absolute value of correlation 607, increment q (q: =q+1) 608, detect time instances with high load for q 609, and configure SCG 610.

In an example according to FIG. 6, an SCG associated with a band that has a higher/highest score, as determined via the operations of FIG. 5, can be selected, at operation 601, as the SCG for use by a private network. The remaining steps of FIG. 6 can implement the SCG selection. At 602, a traffic split between MCG and SCG can be determined. At operations 603 through 610, traffic flows are identified along with times at which the SCG is desirably applied to the identified traffic flows. For example, the traffic flows which can beneficially use the SCG can be those that are both delay sensitive and highly correlated with high load conditions in the private network, as determined via operations 606-609. At operation 610, the SCG can be configured to handle the identified traffic flows at the identified times.

In order to determine a split ratio between the MCG and the selected SCG at operation 602, some embodiments can base the split ratio on spectrum efficiency. The below operations can be applied in an example embodiment.

$$x_{MCG} = d_{MCG}/(d_{MCG} + d_{SCG}),$$

$$x_{SCG} = 1 - x_{MCG}$$

In the above operations, $x_{MCG}$ is the amount of private network traffic processed via the MCG, while $x_{SCG}$ is the amount of private network traffic processed via the SCG. Therefore, $x_{MCG}/x_{SCG}$ is the traffic split ratio. Also, $d_{MCG}$ and $d_{SCG}$ are the spectrum efficiencies of the MCG and SCG, respectively. The values $d_{MCG}$ and $d_{SCG}$ can be calculated as:

$$d_{MCG} = \text{(total number of bits)}_{MCG}/BW_{MCG}$$

$$d_{SCG} = \text{(total number of bits)}_{SCG}/BW_{SCG}$$

Where (total number of bits)$_{MCG}$/BW$_{MCG}$ is the total number of bits processed via the MCG divided by the MCG bandwidth (BW$_{MCG}$), and (total number of bits)$_{SCG}$/BW$_{SCG}$ is the total number of bits processed via the SCG divided by the SCG bandwidth (BW$_{SCG}$). The above operations can operate to split more traffic towards a band with higher spectrum efficiency, and vice versa.

Figure 7:
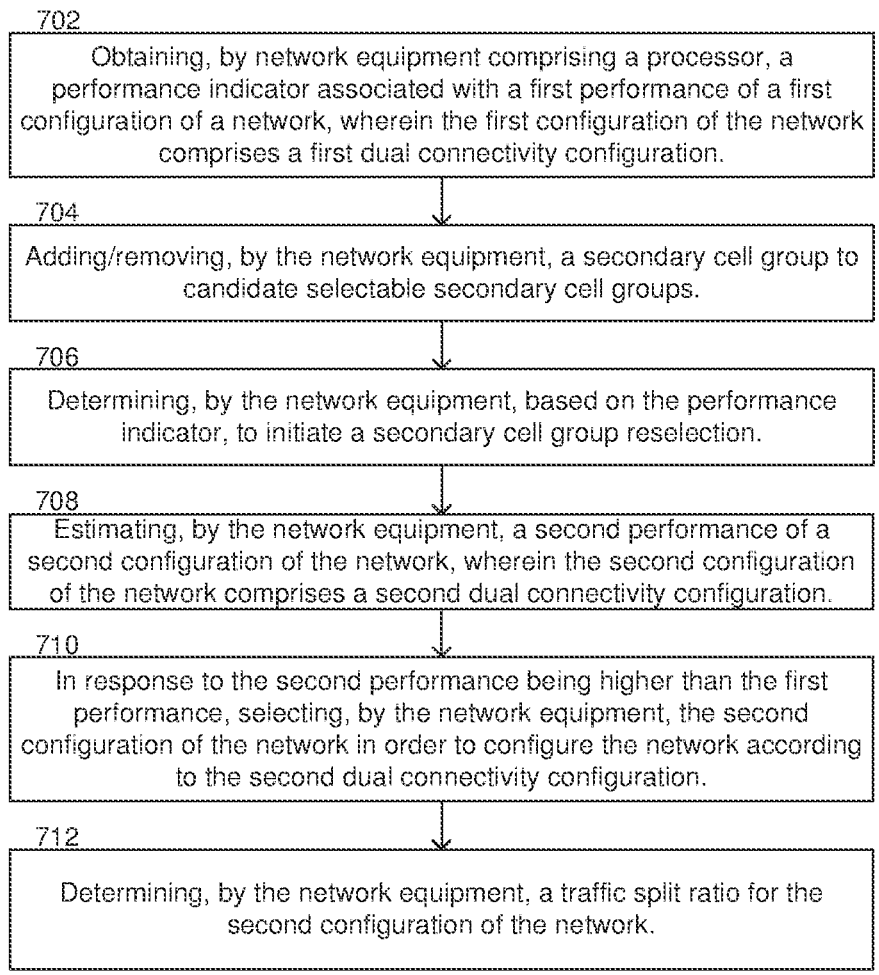
FIG. 7 is a flow diagram of a first example, non-limiting computer implemented method for selecting a secondary cell group for use by a private cellular network, in accordance with one or more embodiments described herein.

FIG. 7 is a flow diagram of a first example, non-limiting computer implemented method for selecting a secondary cell group for use by a private cellular network, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 7 can be performed by network equipment 200 comprising a controller 210 such as illustrated in FIG. 2. Operation 702 comprises obtaining, by network equipment 200 comprising a processor, a performance indicator associated with a first performance of a first configuration of a network, e.g., private network 240, wherein the first configuration of the network 240 comprises a first dual connectivity configuration. In the first dual connectivity configuration, a user equipment, e.g., UE 121, can be enabled to communicate via an MCG and via a selected SCG of respective selectable SCGs. The respective selectable SCGs can be included in at least one public cellular network 230. The performance indicator obtained at operation 702 can comprise, e.g., an indication of a packet delay, an indication of a data rate, or an indication of a coverage area.

Operation 704 comprises adding and/or removing, by the network equipment 200, an SCG to candidate selectable SCGs. For example, the network equipment 200 can add a new SCG to the respective selectable secondary cell groups, or the network equipment 200 can remove an existing SCG from the respective selectable SCGs.

Operation 706 comprises determining, by the network equipment 200, based on the performance indicator, to initiate an SCG reselection. For example, the network equipment 200 can determine, based on the performance indicator obtained via operation 702, to initiate the SCG reselection by detecting a degradation of the first performance of the private network 240, wherein the degradation of the first performance is attributable to the selected SCG that is currently in use by the private network 240 pursuant to the private network's 240 first dual connectivity configuration.

Operation 708 comprises estimating, by the network equipment 200, a second performance of a second configuration of the network 240, wherein the second configuration of the network 240 comprises a second dual connectivity configuration. In the second dual connectivity configuration, the UE 121 can be enabled to communicate via the MCG and via a different SCG of the respective selectable secondary cell groups, different from the current selected SCG. Estimating the second performance of the second configuration of the network 240 can comprise estimating the second performance based on a characteristic of a radio frequency band used by the different SCG. The characteristic of the radio frequency band can comprise, e.g., a subcarrier spacing associated with the radio frequency band or a duplex configuration associated with the radio frequency band.

Operation 710 comprises, in response to the second performance (estimated pursuant to operation 708) being higher than the first performance, selecting, by the network equipment 200, the second configuration of the network 240 in order to configure the network 240 according to the second dual connectivity configuration. In the second dual connectivity configuration, the private network 240 can use the different SCG instead of the current selected SCG. Configuring the network 240 according to the second dual connectivity configuration can comprise, e.g., sending an RRC communication to the UE 121, in order to configure the UE 121 to use the different SCG.

Operation 712 comprises determining, by the network equipment 200, a traffic split ratio for the second configuration of the network 240, wherein the traffic split ratio splits network traffic between the MCG and the different SCG.

Figure 8:
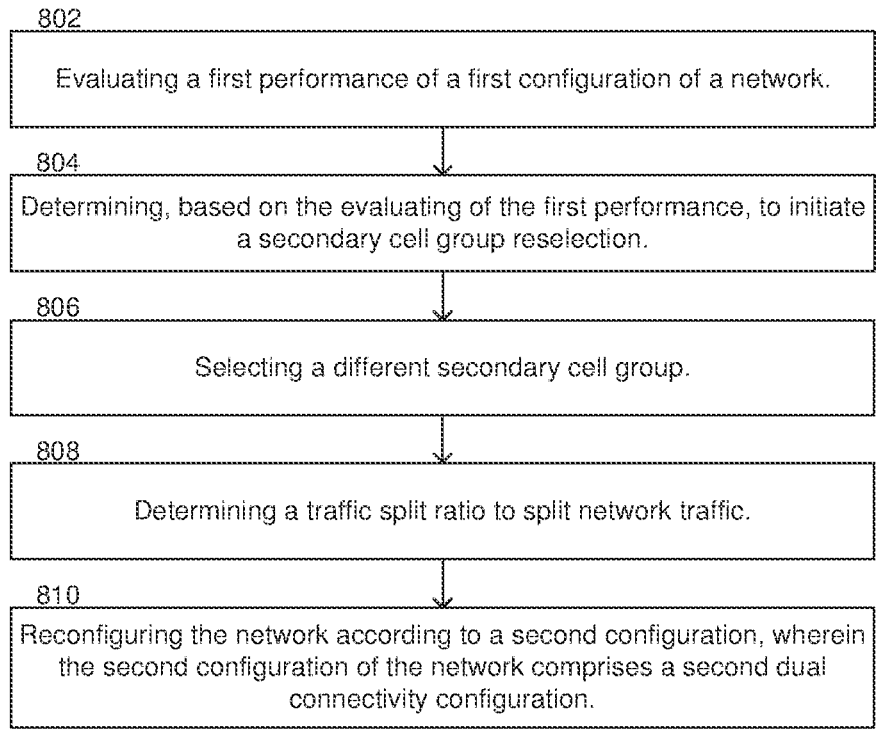
FIG. 8 is a flow diagram of a second example, non-limiting computer implemented method for selecting a secondary cell group for use by a private cellular network, in accordance with one or more embodiments described herein.

FIG. 8 is a flow diagram of a second example, non-limiting computer implemented method for selecting a secondary cell group for use by a private cellular network, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 8 can be performed by network equipment 200 comprising a controller 210 such as illustrated in FIG. 2. Operation 802 comprises evaluating a first performance of a first configuration of a network. For example, a first performance of a first configuration of a network 240 can be evaluated, wherein the first configuration of the network 240 comprises a first dual connectivity configuration in which a user equipment 121 is enabled to communicate via a MCG and via a selected SCG of respective selectable secondary cell groups. The network 240 can be a private cellular network 240 comprising the MCG, and the respective selectable SCGs can be included in at least one public cellular network 230, as can be understood with reference to FIG. 1 and FIG. 2. Evaluating the first performance of the first configuration of the network 240 can comprise monitoring at least one performance indicator, e.g., a KPI, associated with the private cellular network 240.

Operation 804 comprises determining, based on the evaluating of the first performance, to initiate an SCG reselection. The determination can be, e.g., due to a poor performance, below a performance threshold, of the network 240 under conditions in which its current selected SCG is being employed.

Operation 806 comprises selecting a different secondary cell group. For example, a different SCG of the respective selectable SCGs can be selected. The different SCG can be different from the (previously) selected SCG, i.e., the SCG in use during the determination of poor network performance. Selecting the different SCG can be based at least in part on a characteristic of a radio frequency band used by the different SCG. The characteristic of the radio frequency band can comprise, e.g., a subcarrier spacing associated with the radio frequency band or a duplex configuration associated with the radio frequency band. In some embodiments, selecting the different SCG of the respective selectable SCGs can comprise filtering the respective selectable SCGs in order to remove at least one selectable SCG from the respective selectable SCGs.

Operation 808 comprises determining a traffic split ratio to split network traffic between the MCG and the different SCG. Determining traffic splits is described further in connection with FIG. 6. In some embodiments, determining the traffic split ratio can comprise predicting the network traffic, resulting in a network traffic prediction, and using the network traffic prediction to determine the traffic split ratio.

Operation 810 comprises reconfiguring the network 240 according to a second configuration, wherein the second configuration of the network 240 comprises a second dual connectivity configuration in which the UE 121 is enabled to communicate via the MCG and via the different SCG according to the traffic split ratio.

Figure 9:
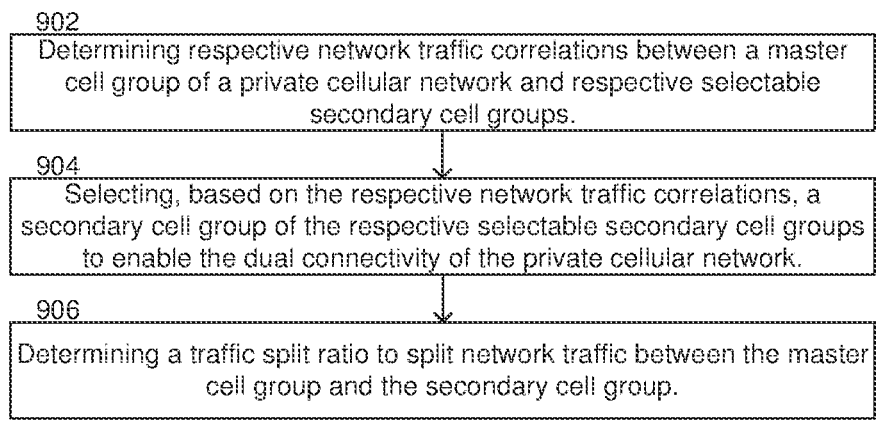
FIG. 9 is a flow diagram of a third example, non-limiting computer implemented method for selecting a secondary cell group for use by a private cellular network, in accordance with one or more embodiments described herein.

FIG. 9 is a flow diagram of a third example, non-limiting computer implemented method for selecting a secondary cell group for use by a private cellular network, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 9 can be performed by network equipment 200 comprising a controller 210 such as illustrated in FIG. 2. Operation 902 comprises determining respective network traffic correlations between a MCG of a private cellular network 240 and respective selectable SCGs. The respective selectable SCGs can be selectable to enable dual connectivity of the private cellular network 240. The respective network traffic correlations can comprise, e.g., correlations between a historical network traffic volume of the MCG and respective historical network traffic volumes of the respective selectable SCGs. Other measurements can also be used for correlation, as described further in connection with FIG. 5.

Operation 904 comprises selecting, based on the respective network traffic correlations, an SCG of the respective selectable SCGs to enable the dual connectivity of the private cellular network 240. The dual connectivity of the private cellular network 240 can enable a UE 121 to communicate via the MCG and via the SCG. In some embodiments, the SCG can be selected based on the respective network traffic correlations determined at operation 902 by applying higher weighted preferences to selectable SCGs of the respective selectable SCGs that are associated with lower network traffic correlations of the respective network traffic correlations. Also, selecting the SCG can be further based on a characteristic of a radio frequency band used by the SCG. The characteristic of the radio frequency band can comprise a subcarrier spacing associated with the radio frequency band or a duplex configuration associated with the radio frequency band. Selecting the SCG can optionally be in response to determining a degraded performance of a dual connectivity configuration of the private cellular network 240.

Operation 906 comprises determining a traffic split ratio to split network traffic between the MCG and the SCG. The traffic split ratio and other configuration parameters such as users, applications, traffic types, and load conditions under which to employ the SCG, can be established when configuring the private cellular network 240 to use the selected SCG.

Figure 10:
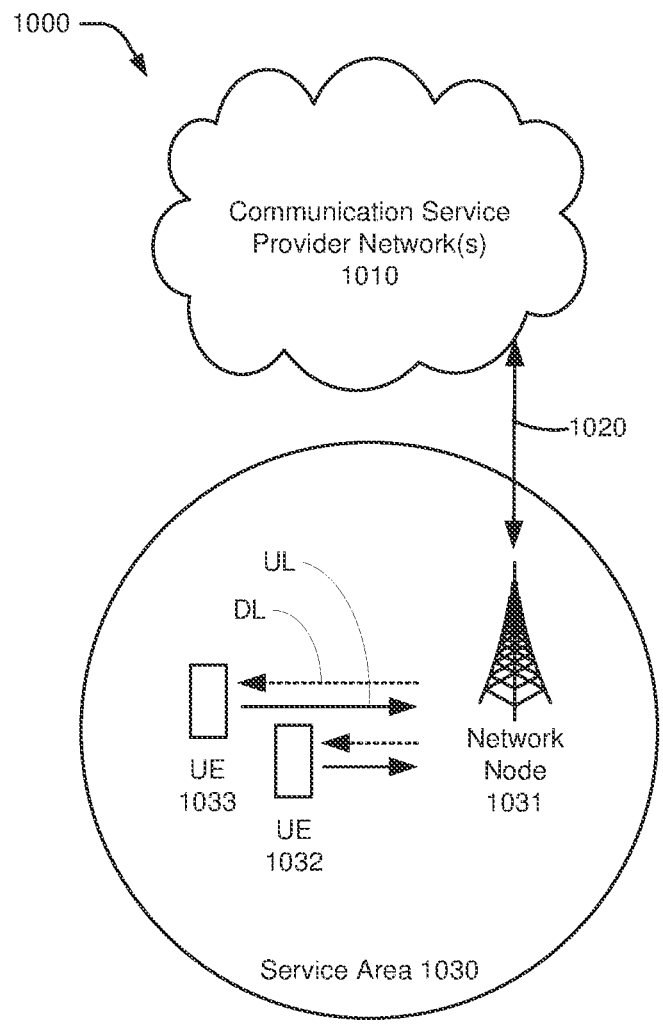
FIG. 10 illustrates an example wireless communication system, in accordance with one or more embodiments described herein.

FIG. 10 illustrates an example wireless communication system 1000, in accordance with one or more embodiments described herein. The example wireless communication system 1000 comprises communication service provider network(s) 1010, a network node 1031, and user equipment (UEs) 1032, 1033. A backhaul link 1020 connects the communication service provider network(s) 1010 and the network node 1031. The network node 1031 can communicate with UEs 1032, 1033 within its service area 1030. The dashed arrow lines from the network node 1031 to the UEs 1032, 1033 represent downlink (DL) communications to the UEs 1032, 1033. The solid arrow lines from the UEs 1032, 1033 to the network node 1031 represent uplink (UL) communications.

In general, with reference to FIG. 10, the non-limiting term "user equipment" can refer to any type of device that can communicate with network node 1031 in a cellular or mobile communication system 1000. UEs 1032, 1033 can have one or more antenna panels having vertical and horizontal elements. Examples of UEs 1032, 1033 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 1032, 1033 can also comprise IOT devices that communicate wirelessly.

In various embodiments, system 1000 comprises communication service provider network(s) 1010 serviced by one or more wireless communication network providers. Communication service provider network(s) 1010 can comprise a "core network". In example embodiments, UEs 1032, 1033 can be communicatively coupled to the communication service provider network(s) 1010 via a network node 1031. The network node 1031 can communicate with UEs 1032, 1033, thus providing connectivity between the UEs 1032, 1033 and the wider cellular network. The UEs 1032, 1033 can send transmission type recommendation data to the network node 1031. The transmission type recommendation data can comprise a recommendation to transmit data via a closed loop multiple input multiple output (MIMO) mode and/or a rank-1 precoder mode.

Network node 1031 can have a cabinet and other protected enclosures, computing devices, an antenna mast, and multiple antennas for performing various transmission operations (e.g., MIMO operations) and for directing/steering signal beams. Network node 1031 can comprise one or more base station devices which implement features of the network node. Network nodes can serve several cells, depending on the configuration and type of antenna. In example embodiments, UEs 1032, 1033 can send and/or receive communication data via wireless links to the network node 1031.

Communication service provider networks 1010 can facilitate providing wireless communication services to UEs 1032, 1033 via the network node 1031 and/or various additional network devices (not shown) included in the one or more communication service provider networks 1010. The one or more communication service provider networks 1010 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 1000 can be or comprise a large-scale wireless communication network that spans various geographic areas. According to this implementation, the one or more communication service provider networks 1010 can be or comprise the wireless communication network and/or various additional devices and components of the wireless communication network (e.g., additional network devices and cell, additional UEs, network server devices, etc.).

The network node 1031 can be connected to the one or more communication service provider networks 1010 via one or more backhaul links 1020. The one or more backhaul links 1020 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 1020 can also comprise wireless link components, such as but not limited to, line-of-sight (LOS) or non-LOS links which can comprise terrestrial air-interfaces or deep space links (e.g., satellite communication links for navigation). Backhaul links 1020 can be implemented via a "transport network" in some embodiments. In another embodiment, network node 1031 can be part of an integrated access and backhaul network. This may allow easier deployment of a dense network of self-backhauled 5G cells in a more integrated manner by building upon many of the control and data channels/procedures defined for providing access to UEs 1032, 1033.

Wireless communication system 1000 can employ various cellular systems, technologies, and modulation modes to facilitate wireless radio communications between devices (e.g., the UEs 1032, 1033 and the network node 1031). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 1000 can operate in accordance with any 5G, next generation communication technology, or existing communication technologies, various examples of which are listed supra. In this regard, various features and functionalities of system 1000 are applicable where the devices (e.g., the UEs 1032, 1033 and the network node 1031) of system 1000 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 1000 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example, several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 11:
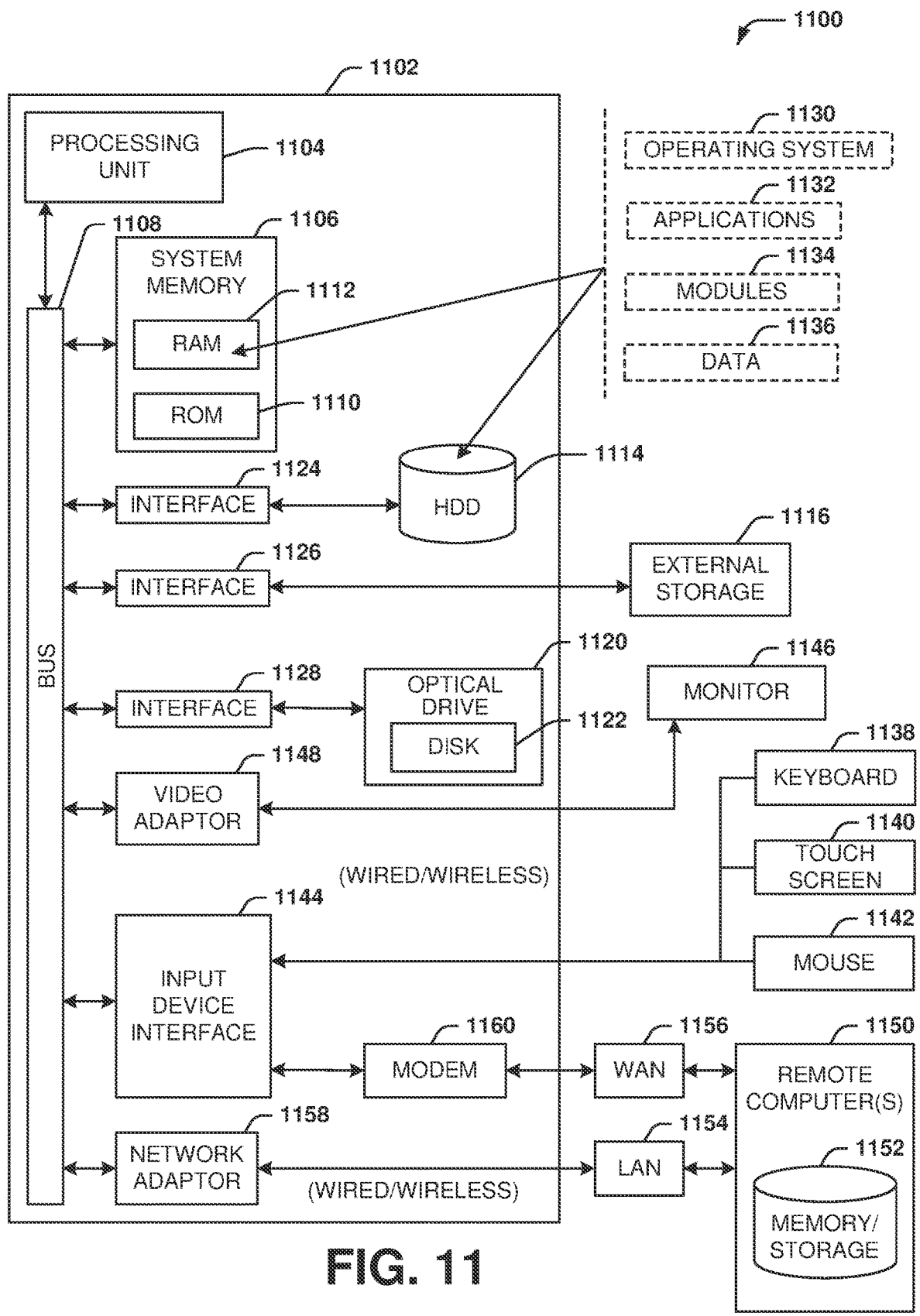
FIG. 11 illustrates a block diagram of an example computer operable to provide any of the various devices described herein.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    obtaining, by network equipment comprising a processor, a performance indicator associated with a first performance of a first configuration of a network,
    wherein the first configuration of the network comprises a first dual connectivity configuration in which a user equipment is enabled to communicate via a master cell group and via a selected secondary cell group of respective selectable secondary cell groups;
    determining, by the network equipment, based on the performance indicator, to initiate a secondary cell group reselection;
    estimating, by the network equipment, a second performance of a second configuration of the network,
    wherein the second configuration of the network comprises a second dual connectivity configuration in which the user equipment is enabled to communicate via the master cell group and via a different secondary cell group of the respective selectable secondary cell groups, different from the selected secondary cell group; and
    in response to the second performance being higher than the first performance, selecting, by the network equipment, the second configuration of the network in order to configure the network according to the second dual connectivity configuration.

2. The method of claim 1, wherein the network is a private cellular network comprising the master cell group, and wherein the respective selectable secondary cell groups are included in at least one public cellular network.

3. The method of claim 1, wherein the performance indicator comprises at least one of an indication of a packet delay, an indication of a data rate, or an indication of a coverage area.

4. The method of claim 1, wherein determining, based on the performance indicator, to initiate the secondary cell group reselection comprises detecting a degradation of the first performance, and wherein the degradation of the first performance is attributable to the selected secondary cell group.

5. The method of claim 1, further comprising:
adding, by the network equipment, a new secondary cell group to the respective selectable secondary cell groups; or
removing, by the network equipment, an existing secondary cell group from the respective selectable secondary cell groups.

6. The method of claim 1, wherein estimating the second performance of the second configuration of the network comprises estimating the second performance based on a characteristic of a radio frequency band used by the different secondary cell group.

7. The method of claim 6, wherein the characteristic of the radio frequency band comprises a subcarrier spacing associated with the radio frequency band or a duplex configuration associated with the radio frequency band.

8. The method of claim 1, further comprising determining, by the network equipment, a traffic split ratio for the second configuration of the network, wherein the traffic split ratio splits network traffic between the master cell group and the different secondary cell group.

9. The method of claim 1, wherein configuring the network according to the second dual connectivity configuration comprises sending a radio resource control communication to the user equipment, in order to configure the user equipment to use the different secondary cell group.

10. Network equipment, comprising:
a processor; and
a memory that stores executable instructions that, when executed by the processor, facilitate performance of operations, comprising:
evaluating a first performance of a first configuration of a network,
wherein the first configuration of the network comprises a first dual connectivity configuration in which a user equipment is enabled to communicate via a master cell group and via a selected secondary cell group of respective selectable secondary cell groups;
determining, based on the evaluating of the first performance, to initiate a secondary cell group reselection;
selecting a different secondary cell group of the respective selectable secondary cell groups, wherein the different secondary cell group is different from the selected secondary cell group, and wherein selecting the different secondary cell group is based on a characteristic of a radio frequency band used by the different secondary cell group;
determining a traffic split ratio to split network traffic between the master cell group and the different secondary cell group; and
reconfiguring the network according to a second configuration, wherein the second configuration of the network comprises a second dual connectivity configuration in which the user equipment is enabled to communicate via the master cell group and via the different secondary cell group according to the traffic split ratio.

11. The network equipment of claim 10, wherein the network is a private cellular network comprising the master cell group, and wherein the respective selectable secondary cell groups are included in at least one public cellular network.

12. The network equipment of claim 11, wherein evaluating the first performance of the first configuration of the network comprises monitoring at least one performance indicator associated with the private cellular network.

13. The network equipment of claim 10, wherein selecting the different secondary cell group of the respective selectable secondary cell groups comprises filtering the respective selectable secondary cell groups in order to remove at least one selectable secondary cell group from the respective selectable secondary cell groups.

14. The network equipment of claim 10, wherein determining the traffic split ratio comprises predicting the network traffic, resulting in a network traffic prediction, and using the network traffic prediction to determine the traffic split ratio.

15. The network equipment of claim 10, wherein the characteristic of the radio frequency band comprises a subcarrier spacing associated with the radio frequency band or a duplex configuration associated with the radio frequency band.

16. A non-transitory machine-readable medium, comprising executable instructions that, when executed by a processor, facilitate performance of operations, comprising:
determining respective network traffic correlations between a master cell group of a private cellular network and respective selectable secondary cell groups,
wherein the respective selectable secondary cell groups are selectable to enable dual connectivity of the private cellular network,
wherein the respective network traffic correlations comprise correlations between a historical network traffic volume of the master cell group and respective historical network traffic volumes of the respective selectable secondary cell groups; and
selecting, based on the respective network traffic correlations, a secondary cell group of the respective selectable secondary cell groups to enable the dual connectivity of the private cellular network,
wherein the dual connectivity of the private cellular network enables a user equipment to communicate via the master cell group and via the secondary cell group, and
wherein the secondary cell group is selected based on the respective network traffic correlations by applying higher weighted preferences to selectable secondary cell groups of the respective selectable secondary cell groups that are associated with lower network traffic correlations of the respective network traffic correlations.

17. The non-transitory machine-readable medium of claim 16, wherein selecting the secondary cell group is in response to determining a degraded performance of a dual connectivity configuration of the private cellular network.

18. The non-transitory machine-readable medium of claim 16, wherein selecting the secondary cell group is further based on a characteristic of a radio frequency band used by the secondary cell group.

19. The non-transitory machine-readable medium of claim 18, wherein the characteristic of the radio frequency band comprises a subcarrier spacing associated with the radio frequency band or a duplex configuration associated with the radio frequency band.

20. The non-transitory machine-readable medium of claim 16, wherein the operations further comprise determining a traffic split ratio to split network traffic between the master cell group and the secondary cell group.

\* \* \* \* \*